(No Model.) 3 Sheets—Sheet 2.
C. TANNER.
CULTIVATOR.
No. 576,748. Patented Feb. 9, 1897.
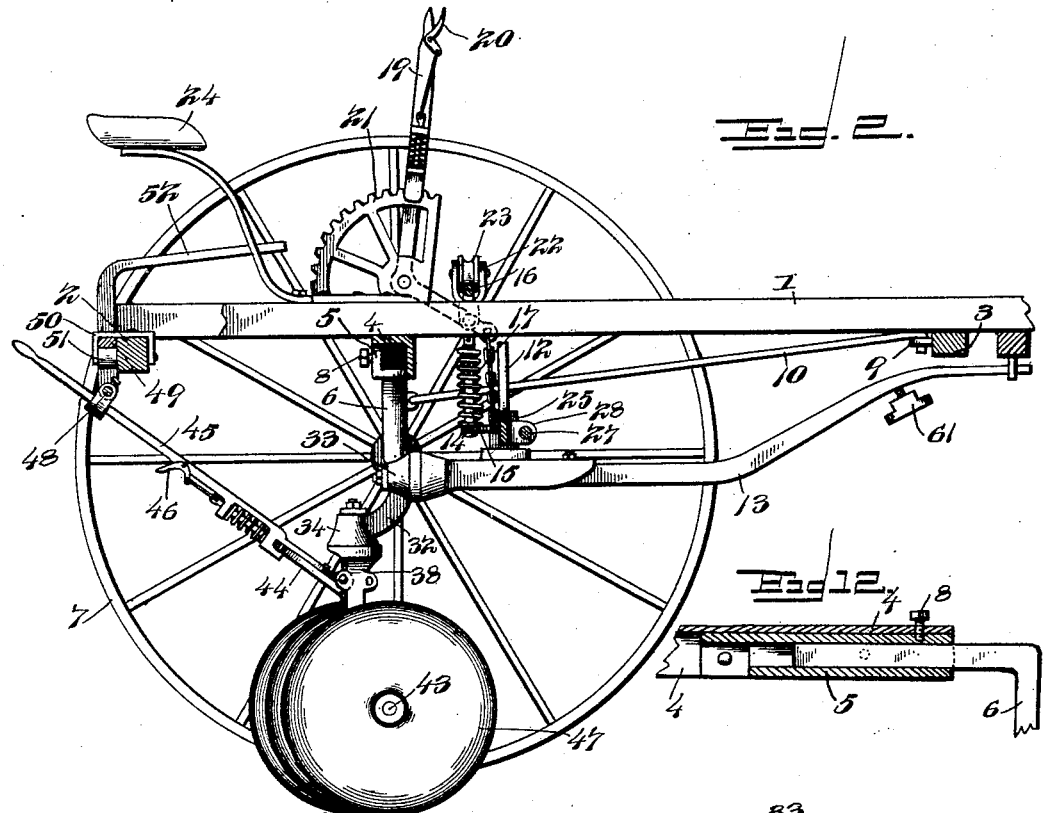
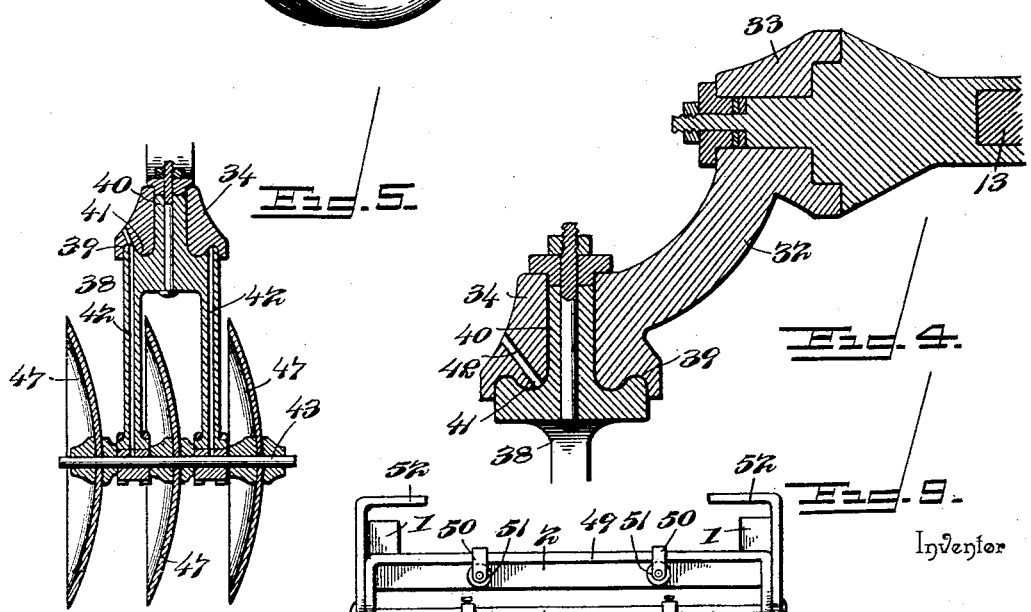
Witnesses
E. K. Stewart
V. B. Hillyard
Inventor
Charles Tanner
By C. A. Snow & Co. Attorneys

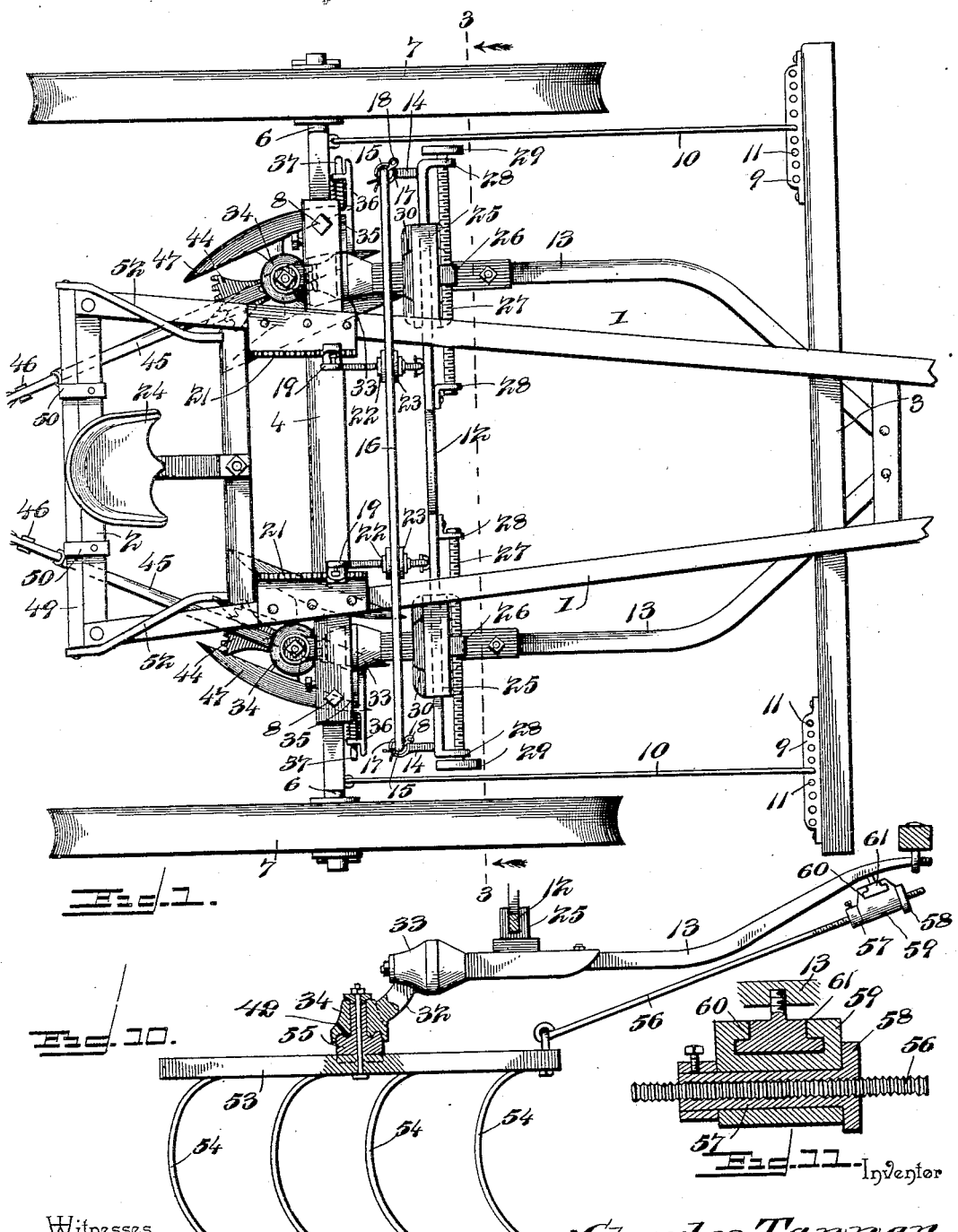

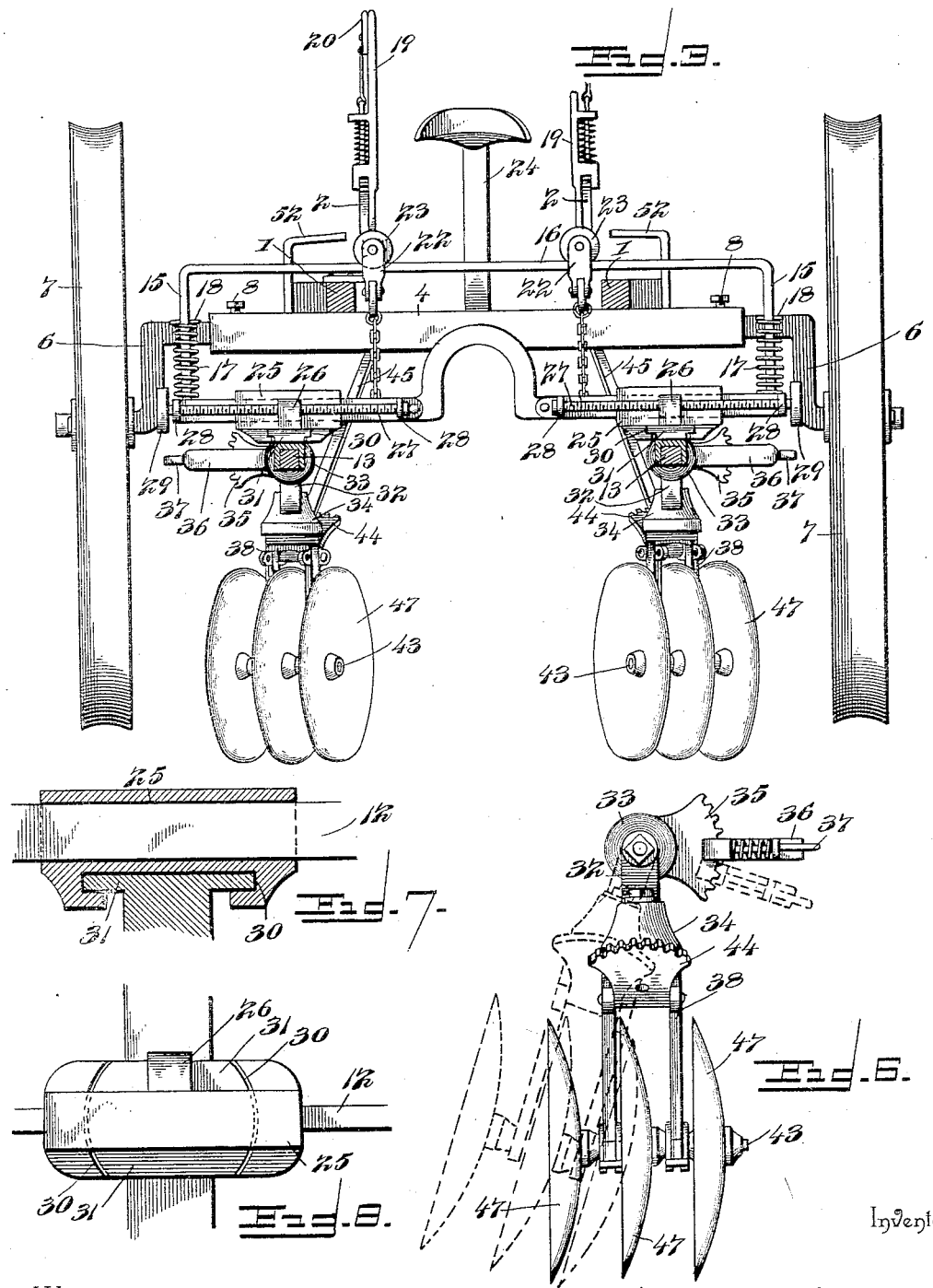

UNITED STATES PATENT OFFICE.

CHARLES TANNER, OF CHENEYVILLE, LOUISIANA.

CULTIVATOR.

SPECIFICATION forming part of Letters Patent No. 576,748, dated February 9, 1897.

Application filed May 14, 1896. Serial No. 591,531. (No model.)

*To all whom it may concern:*

Be it known that I, CHARLES TANNER, a citizen of the United States, residing at Cheneyville, in the parish of Rapides and State of Louisiana, have invented a new and useful Cultivator, of which the following is a specification.

This invention relates to agricultural implements for tilling the soil preparatory to planting and for cultivating the plants when required.

One of the principal features of the invention is to facilitate the adjustment of the earth-treating devices, whether disks or harrow-teeth, without necessitating the employment of a wrench or other tool or the tightening and loosening of bolts and to enable the adjustment to be effected in a moment's time. The earth-treating devices are capable of vertical adjustment, whereby the elementary parts at one end of a gang may be caused to penetrate the ground to a greater or less depth than the remote elements at the opposite end of the said gang, are capable of horizontal adjustment, so as to throw the earth toward or from the rows, and, lastly, adapted to be separated or brought together to adapt the distance apart of the gangs to the width of the rows as required.

A further purpose of the invention is to devise means for exerting a downward pressure to hold the earth-treating devices to the work, said pressure being applied perpendicularly, whereby the gangs of earth-treating devices can be guided easily to obviate injury to the plants during the operation of cultivating.

The improvement also has for its object to improve the class of machines to which the present invention belongs and to increase their usefulness and efficiency and to devise simple means for attaining the various adjustments without requiring the employment of a wrench or necessitating the manipulating of bolts or similar fastenings.

For a full understanding of the merits and advantages of the invention reference is to be had to the accompanying drawings and the following description.

The improvement is susceptible of various changes in the form, proportion, and the minor details of construction without departing from the principle or sacrificing any of the advantages thereof, and to a full disclosure of the invention an adaptation thereof is shown in the accompanying drawings, in which—

Figure 1 is a top plan view of a cultivator constructed in accordance with the principles of this invention. Fig. 2 is a side elevation. Fig. 3 is a rear view. Fig. 4 is a detail section of the connections between a gang-frame and beam. Fig. 5 is a detail section of a gang-frame, the curved bracket to which the gang-frame is attached, and the plowing-disks. Fig. 6 is a detail view, in rear elevation, of a gang-frame and the parts intimately associated therewith. Figs. 7 and 8 are detail views of the means for connecting a slidable block with the arched bar. Fig. 9 is a detail view, in rear elevation, of the means for connecting and simultaneously operating the handles provided for steering the gangs. Fig. 10 is a detail view, in side elevation, showing the manner of applying a harrow attachment to the implement. Fig. 11 is a sectional detail of the instrumentalities for adjustably connecting the front end of the harrow-brace with the beam. Fig. 12 is a transverse section of a crank-axle and its mountings.

Corresponding and like parts are referred to in the following description and indicated in the several views of the accompanying drawings by the same reference-characters.

The frame, which may be of any desired construction, is shown as comprising longitudinal bars 1, converging toward their front ends, a rear bar 2, a front bar 3, and an intermediate transverse bar 4, forming the body portion of the axle. The longitudinal bars 1 may be extended to form a pole or tongue, or the latter may be applied to the frame in any well-known manner, and is adapted to have the team hitched thereto for drawing the implement over the ground.

A cast-metal box 5 is adjustably connected to each end of the bar 4, thereby admitting of the latter being lengthened or shortened, any suitable means being employed for effecting the connection between the parts, and, as shown, the boxes are secured by bolts or similar removable fastenings to the end portions of the bar 4. Crank-arms 6 have adjustable connection with the boxes 5 and are formed with spindles, upon which are mounted the ground-wheels 7 in the usual way. The upper horizontal portion of each crank-arm is made angular and is slidably fitted in a correspondingly-formed opening of the adjacent box, whereby the crank-arm is prevented from turning. The slidable connection of the crank-arms with the boxes admits of the ground-wheels being separated or brought together, according to the distance apart of the rows or hills to be cultivated. Binding-screws 8, let into threaded openings in the sides of the boxes, are adapted to have their inner ends bear against the sides of the horizontal portions of the crank-arms, so as to hold the latter in the required adjusted position. When it is required to adjust the ground-wheels laterally a great distance, one or both of the boxes 5 are shifted either inward or outward, according as it is required to spread the ground-wheels or bring them closer together, and a small adjustment is secured by moving one or both of the crank-arms. A casting 9 is firmly attached to each end of the front bar 3, and a stay-rod 10, one for each crank-arm, has connection with the latter at its rear end about in line with the spindle and has its front end bent to be fitted into any one of a series of openings 11 in the said casting 9. As the crank-arm is moved inward or outward the front end of the stay-rod is correspondingly shifted and makes positive connection with the casting 9 in the manner just described.

An arched bar 12 extends transversely of the implement and connects the beams 13 and has lateral eyes 14 at its ends, through which pass the bent ends 15 of a lifting-bar 16, the latter having its horizontal portion extending about parallel with the arched bar and suitably mounted with respect to the frame, so that it and the arched bar can move laterally to shift the beams when required to avoid injurious contact of the earth-treating devices with the plants or hills. The bent ends or terminal portions 15 of the lifting-bar extend vertically and operate loosely through the eyes 14, and coil-springs 17, placed thereon and confined between stops 18 near the upper ends of the parts 15 and the eyes 14, exert a downward pressure upon the arched bar sufficient to hold the earth-treating devices to their work. It has been demonstrated that the best results are attained by locating the tension-springs 17 so that they exert a downward pressure in a vertical direction, as thereby the beams can be guided more readily, so as to avoid injury to the crop.

The lifting-bar 16 is under the control of the driver, so as to be raised when it is required to elevate the earth-treating devices from the ground to admit of the beams 13 being shifted laterally or for any desired purpose. Any appropriate means for effecting this result may be resorted to, and, as shown, a lever 19 is provided and has the ordinary hand-latch 20 to engage with a notched segment 21, whereby the lifting-bar may be held at any elevation. A frame 22, having a sheave-wheel 23, is connected with the lever 19 in such a manner that upon a proper adjustment of the lever the required movement of the lifting-bar may be attained. It will be observed that the lifting-bar is adapted to move loosely through the frame 22, the sheave-wheel 23 reducing the friction to a minimum. The lever 19 is disposed so as to be within convenient reach of the driver's seat 24. A block 25 is slidably mounted upon the horizontal end portion of the arched bar 12 and has an internally-threaded lug 26, which receives a feed-screw 27, journaled at its ends in ears 28, applied to or formed with the arched bar 12. This feed-screw is turned in its bearings 28 by means of a hand-wheel 29, provided at its outer end, and upon rotating the feed-screw in one or the other direction the block 25 is moved along the arched bar, as is obvious. Each end portion of the arched bar will be similarly equipped. Hence a description in detail of the one will suffice for a clear understanding of the invention. A segmental socket 30 is formed upon the lower side of each block 25 and receives a corresponding projection 31 on the top side of each beam 13, whereby an interlocking joint is had between the block and the beam, this joint being of such a nature as to admit of the horizontal adjustment of the beam and the ready detachment of the latter from the block when required. The coupling of a beam 13 with the block is effected by turning the beam parallel, or nearly so, with the arched bar and fitting the projection 31 into the segmental socket 30, after which the beam is turned about at right angles to the arched bar, which causes the segmental socket and the corresponding segmental projection to interlock.

A curved or quadrant-shaped bracket 32 is had for each beam 13 and is formed at its ends with right-angularly-disposed bearings 33 and 34, the former receiving a reduced portion at the end of a beam 13 and the latter having the shank of the gang of earth-treating devices journaled therein. The arcuate adjustment of the bracket with respect to the beam 13 controls the horizontal position of the gang of earth-treating devices, whereby the latter may be caused to penetrate the soil to an equal depth or the devices at one end of the gang be made to enter the soil to a greater or less distance than the devices at the opposite end of the gang. A notched segment 35 and a lever 36, having a hand-latch 37, are provided to hold the bracket in its adjusted position. As shown, the notched segment is integral with the bracket, and the lever is practically a part of the beam, but the position of these parts may be reversed and the same result attained.

The gang-frame 38 is provided with an annular shoulder 39 at the base of its shank 40, and this shoulder 39 is channeled or grooved in its top side, forming an oil-chamber 41, from which extend ducts 42 to convey the oil through the vertical side members of the frame to the axle 43, journaled to the lower ends thereof. The gang-frame can be turned in the bearing 34 to change the inclination of the axle 43 to the line of draft, so as to throw the earth to a greater or less degree, according to the nature of the work. A notched segment 44 has pivotal connection with the gang-frame 38, and a rod or bar 45, forming a handle, extends rearwardly from the notched segment and has pivotal connection therewith and is supplied with a hand-latch 46 to engage with any one of the series of teeth of the notched segment to hold the latter and the gang-frame in an adjusted position. The notched segment 44 has pivotal connection with lugs cast on the gang-frame, and a pin or bolt forms the means of connection between the parts. The relative position of the gang-frame can be reversed to throw the earth either toward or away from the plants or hills, and for this purpose the notched segment is detachably connected with the gang-frame, and the latter is provided at its front and rear with similar lugs to receive the bolt or pin employed for pivotally connecting the notched segment to the gang-frame. The disks 47 are dished and are mounted upon the axle 43, so as to rotate therewith.

The rods or bars 45, forming the rear handles, are under the control of the driver to shift the beams 13 laterally, so as to avoid plants and hills. When the driver is mounted upon the machine, these parts 45 will have connection with a rod 48, which is supported in the bent terminal portions of a rod or bar 49, slidably mounted in keepers 50, applied to the rear bar 2, said keepers having anti-friction-rollers 51 for the rod or bar 49 to move upon. Handles 52 are secured to the rod or bar 49 and extend within convenient reach of the driver to be moved laterally for steering or guiding the beams 13.

If preferred, the handles 52 may be replaced by foot-rests, so that the driver may direct the beams by the action of the feet, thereby leaving the hands free for driving, for operating the lever 19, and for other purposes.

When it is required to harrow the land, the gang of disk cutters is replaced by a harrowing attachment, the latter consisting of a head or bar 53, spring-teeth 54, a metal shank 55, and a brace 56. The shank 55 is journaled in the bearing 34, and the angle of the head or bar 53 to the line of draft is regulated by means of the brace 56, which has adjustable connection at its front end with the adjacent beam 13. The front portion of the brace is threaded, and a sleeve 57 is mounted thereon and is adapted to be turned by means of a button or hand-wheel 58 to cause the front portion of the brace 56 to move through the said sleeve 57, so as to attain the proper inclination of the harrow attachment. A block 59 is mounted upon the sleeve 57 and has a segmental socket 60 in a side to interlock with a segmental projection 61 at or near the front end of the contiguous beam 13. By means of this interlocking joint between the block 59 and the beam the brace 56 can be detachably connected with the beam in a moment's time.

When it is required to separate the beams 13 or bring them closer together, the feed-screws 27 are rotated, thereby shifting the blocks 25 upon the horizontal portions of the arched bar 12. The arcuate adjustment of the curved brackets 32 to set the gang of earth-treating devices at a greater or less angle to the horizontal is effected by releasing the hand-latch 37 and turning the bracket upon the part mounted in the bearing 33, the position of the bracket being fixed by permitting the hand-latch 37 to engage with a tooth of the segment 35. The inclination of the disk cutters 47 to the line of draft is controlled by turning the gang-frame in the bearing 34, and the said gang-frame is secured in the located position by engaging the hand-latch 46 with the notched segment 44.

The implement can be used in the capacity of a walking-cultivator by removing the ground-wheels 7, the crank-arms 6, and the intermediate connections, the rear portions of the beams being supported by means of the earth-treating devices and the said beams being directed or guided by the rods or handles 45, as herein described.

The rod 48 has eye-castings 62 adjustably secured thereon and through which operate the handles 45, the latter moving through the castings 62 when shifting the bar 48 laterally to steer the gangs.

Having thus described the invention, what is claimed as new is—

1. In an agricultural implement, the combination of a beam, a quadrantal-shaped bracket having bearings at its ends disposed at right angles relative to each other, the upper or horizontal bearing receiving a portion of the beam upon which it is mounted, a gang journaled in the vertical bearing at the opposite end of the bracket, and independent means for adjusting the bracket relatively to the beam and the gang relatively to the bracket and holding the parts in the adjusted position, substantially as set forth.

2. In an agricultural implement, the combination of a beam having its rear end reduced and provided with a latch-lever, a quadrantal-shaped bracket having right-angularly-disposed bearings at its ends and having a notched segment at one extremity to coöperate with the latch-lever of the beam, whereby the bracket is held at any angular adjustment, the upper or horizontal bearing receiving the reduced portion of the beam, a gang of earth-treating devices journaled in the lower or vertical bearing of the bracket, and means under the control of the driver for turning the gang upon its vertical axis, substantially in the manner set forth for the purpose described.

3. In an agricultural implement, the combination of beams bearing earth-treating devices, a rod or bar connecting the beams, blocks formed with internally-threaded lugs and slidably mounted upon the said connecting-bar and having positive connection with the beams, and feed-screws journaled to the said rod and coöperating with the aforesaid threaded lugs for adjusting the blocks upon the connecting-bar for separating or bringing the beams closer together, substantially as described.

4. In an agricultural implement, the combination of a frame, beams bearing earth-treating devices having loose connection at their front ends with the frame, a laterally-adjustable rod or bar, pivotal connections between the beams and the said rod or bar, and feed-screws carried by the rod or bar for independently adjusting the connections between the beams and the rod or bar, substantially as and for the purpose set forth.

5. In an agricultural implement, the combination of a frame, beams bearing earth-treating devices and having loose connection at their front ends with the frame, a transversely-disposed rod or bar capable of being shifted laterally, pivotal connections between the beams and the rod or bar, means for independently adjusting the beams laterally, a lifting-bar having its terminal portions bent vertically and making loose connection with the aforesaid transverse rod or bar, springs mounted upon the bent ends of the lifting-bar and exerting a downward pressure upon the transverse rod or bar, and a lever under the control of the driver for raising and lowering the lifting-bar, substantially as and for the purpose set forth.

6. In an agricultural implement, the combination with a transversely-disposed bar capable of lateral movement, beams bearing earth-treating devices and having connection with the said bar, a lifting-bar having vertical portions making loose and positive connection with the transverse bar, and coil-springs mounted upon the vertical portions of the lifting-bar and exerting a downward pressure upon the aforesaid transverse bar, of a frame having a sheave-wheel to receive the horizontal portion of the lifting-bar, and a lever operatively connected with the sheave-wheel frame and provided with means for holding it in an adjusted position, substantially as set forth for the purpose described.

7. In an agricultural implement, the combination with a transversely-disposed bar, and a beam bearing earth-treating devices, of a block slidably mounted upon the transverse bar and having a threaded lug, and a feed-screw journaled to the transverse bar and operating in the threaded lug of the block to move the latter and hold it in an adjusted position, substantially as and for the purpose set forth.

8. In an agricultural implement, the combination of a horizontal bar, metal boxes having adjustable connection with the ends of the bar, crank-arms slidably fitted within the metal boxes and adapted to be secured in an adjusted position, and ground-wheels mounted upon the spindles of the crank-arms, substantially as set forth.

9. The combination of a support having a vertical bearing and having an annular groove in its lower face, and a gang-frame having a shank journaled in the said bearing and formed with an annular shoulder to fit the said annular groove, and having an annular chamber at the base of the shank to receive a corresponding portion of the said bearing, and having an oil-duct leading from the annular chamber through a side of the bearing, substantially as set forth.

10. The combination with a beam having a vertical bearing, a head bearing earth-treating devices and journaled vertically in the said bearing, and a brace having connection with the said head and threaded at its front end, of a sleeve mounted upon the threaded portion of the brace, and a block carried by the sleeve and interlocking with the front end of the beam, substantially as set forth for the purpose described.

In testimony that I claim the foregoing as my own I have hereto affixed my signature in the presence of two witnesses.

CHARLES TANNER.

Witnesses:
W. H. ROBERT,
SAM. BLUM.